US012558721B2

(12) United States Patent
Yang et al.

(10) Patent No.: US 12,558,721 B2
(45) Date of Patent: Feb. 24, 2026

(54) 4D PRINTING METHOD FOR IN-SITU REGULATION OF FUNCTIONAL PROPERTIES OF NICKEL-TITANIUM ALLOY AND USE THEREOF

(71) Applicants:SOUTH CHINA UNIVERSITY OF TECHNOLOGY, Guangzhou (CN); GUANGDONG HUAYI PLUMBING FITTINGS INDUSTRY CO., LTD., Kaiping City (CN); SUN YAT-SEN UNIVERSITY CANCER CENTER, Guangzhou (CN)

(72) Inventors: Chao Yang, Guangzhou (CN); Haizhou Lu, Guangzhou (CN); Yanfei Ding, Kaiping City (CN); Yuanyuan Li, Guangzhou (CN); Jin Wang, Guangzhou (CN)

(73) Assignees: SOUTH CHINA UNIVERSITY OF TECHNOLOGY, Guangzhou (CN); GUANGDONG HUAYI PLUMBING FITTINGS INDUSTRY CO., LTD., Kaiping (CN); SUN YAT-SEN UNIVERSITY CANCER CENTER, Guangzhou (CN)

( * ) Notice: Subject to any disclaimer, the term of this patent is extended or adjusted under 35 U.S.C. 154(b) by 921 days.

(21) Appl. No.: 17/288,924

(22) PCT Filed: Apr. 8, 2020

(86) PCT No.: PCT/CN2020/083670
§ 371 (c)(1),
(2) Date: Apr. 27, 2021

(87) PCT Pub. No.: WO2021/027300
PCT Pub. Date: Feb. 18, 2021

(65) Prior Publication Data
US 2021/0394269 A1 Dec. 23, 2021

(30) Foreign Application Priority Data

Aug. 9, 2019 (CN) .......................... 201910733028.9

(51) Int. Cl.
*B22F 1/00* (2022.01)
*B22F 1/05* (2022.01)
(Continued)

(52) U.S. Cl.
CPC .................. *B22F 1/09* (2022.01); *B22F 1/14* (2022.01); *B22F 1/17* (2022.01); *B22F 9/082* (2013.01);
(Continued)

(58) Field of Classification Search
CPC ...... B22F 1/09; B22F 1/14; B22F 1/17; B22F 9/082; B22F 10/34; B22F 1/05;
(Continued)

(56) References Cited

U.S. PATENT DOCUMENTS 4,283,233 A 8/1981 Goldstein et al.

FOREIGN PATENT DOCUMENTS

CN 1780924 5/2006
CN 101285134 A * 10/2008
(Continued)

OTHER PUBLICATIONS

CN-109022920-A (Year: 2018).*
CN-101285134-A (Year: 2008).*

*Primary Examiner* — Ricardo D Morales
(74) *Attorney, Agent, or Firm* — JMB Davis Ben-David

(57) ABSTRACT

The present invention belongs to the field of additive manufacturing technology, and discloses a 4D printing method capable of in-situ regulating functional properties of nickel-titanium (NiTi) alloys and the application thereof. The method comprises the following steps: subjecting NiTi alloy
(Continued)

$D_{50}$~37.9 μm

Percentage (%)

Particle size of powder *d* (μm)

bars to atomization milling to obtain NiTi alloy powder with a particle size of 15-53 µm, placing the NiTi alloy powder in a discharge plasma assisted ball mill for discharge treatment to promote the activation of powder activity, then adding nano-sized Ni powder with a particle size of 100-800 nm to obtain mixed powder, then continuing the discharge treatment to realize the metallurgical bonding between the NiTi alloy powder and the nano-sized Ni powder to obtain the modified powder, and finally using the additive manufacturing technology to prepare and form the modified powder into a functionalized NiTi alloy. The present invention achieves the metallurgical bonding between the nano-sized Ni powder and the large-sized spherical NiTi alloy powder by adding the nano-sized Ni powder in the process of discharge treatment, which is conducive to preparing a bulk alloy with uniform composition, structure and properties and the parts made therewith.

6 Claims, 1 Drawing Sheet

(51) Int. Cl.

| | | |
|---|---|---|
| *B22F 1/14* | (2022.01) | |
| *B22F 1/17* | (2022.01) | |
| *B22F 9/08* | (2006.01) | |
| *B22F 10/28* | (2021.01) | |
| *B22F 10/34* | (2021.01) | |
| *B22F 10/36* | (2021.01) | |
| *B22F 10/366* | (2021.01) | |
| *B23K 26/342* | (2014.01) | |
| *B23K 103/14* | (2006.01) | |
| *B33Y 10/00* | (2015.01) | |
| *B33Y 40/10* | (2020.01) | |
| *B33Y 70/00* | (2020.01) | |
| *C22C 1/04* | (2023.01) | |
| *C22C 14/00* | (2006.01) | |
| *C22C 19/00* | (2006.01) | |
| *C22C 19/03* | (2006.01) | |

(52) U.S. Cl.
CPC ............ *B22F 10/34* (2021.01); *B23K 26/342* (2015.10); *B33Y 10/00* (2014.12); *B33Y 40/10* (2020.01); *B33Y 70/00* (2014.12); *C22C 14/00* (2013.01); *C22C 19/007* (2013.01); *C22C 19/03* (2013.01); *B22F 1/05* (2022.01); *B22F 2009/0836* (2013.01); *B22F 10/28* (2021.01); *B22F 10/36* (2021.01); *B22F 10/366* (2021.01); *B22F 2301/15* (2013.01); *B22F 2301/205* (2013.01); *B22F 2304/10* (2013.01); *B23K 2103/14* (2018.08)

(58) Field of Classification Search
CPC ........ B22F 10/28; B22F 10/36; B22F 10/366; B22F 2009/0836; B22F 2301/15; B22F 2301/205; B22F 2304/10; B22F 9/10; B22F 2998/10; B22F 2999/00; B22F 9/14; B22F 10/00; B23K 26/342; B23K 2103/14; B33Y 10/00; B33Y 40/10; B33Y 70/00; B33Y 50/02; B33Y 80/00; C22C 1/0433; C22C 1/0458; C22C 14/00; C22C 19/007; C22C 19/03; Y02P 10/25
See application file for complete search history.

(56) References Cited

FOREIGN PATENT DOCUMENTS

| | | | | |
|---|---|---|---|---|
| CN | 102744129 | 10/2012 | | |
| CN | 103240412 | 8/2013 | | |
| CN | 104128606 | 11/2014 | | |
| CN | 105268973 | 1/2016 | | |
| CN | 106948091 | 7/2017 | | |
| CN | 109022920 A | * 12/2018 | ............ | B22F 3/1055 |
| CN | 109332680 | 2/2019 | | |
| CN | 109648082 | 4/2019 | | |
| CN | 110465662 | 11/2019 | | |

* cited by examiner

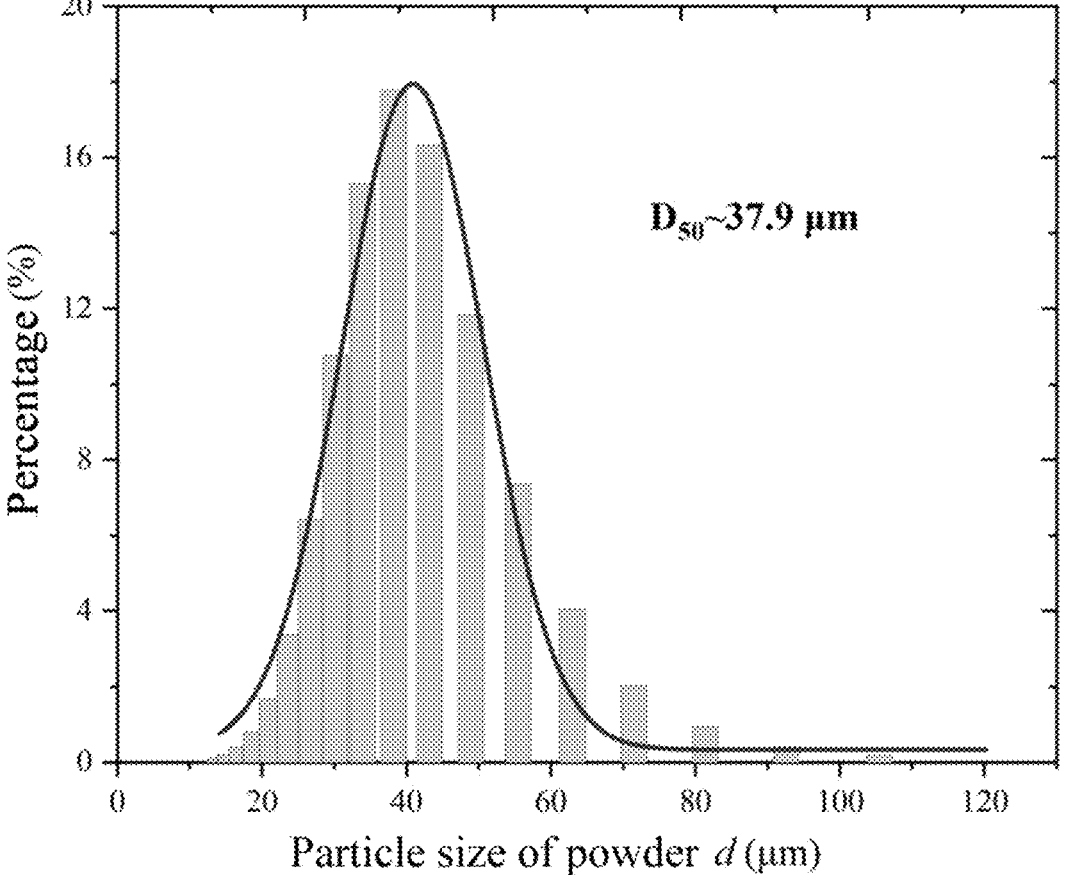

4D PRINTING METHOD FOR IN-SITU REGULATION OF FUNCTIONAL PROPERTIES OF NICKEL-TITANIUM ALLOY AND USE THEREOF

CROSS-REFERENCE TO RELATED APPLICATIONS

This is the U.S. National Stage of International Patent Application No. PCT/CN2020/083670 filed on Apr. 8, 2020, which in turn claims the benefit of Chinese Patent Application No. 201910733028.9 filed on Aug. 9, 2019.

FIELD OF THE INVENTION

The present invention belongs to the field of additive manufacturing technology, and specifically relates to a 4D printing method capable of in-situ regulating functional properties of nickel-titanium (NiTi) alloys and the application thereof.

BACKGROUND OF THE INVENTION

NiTi-based shape memory alloys have excellent biocompatibility, and are widely used in biomedical fields such as orthodontic wires, spinal orthopedic rods, angioplasty rings and surgical micro forceps. Besides, they are widely used in the fields of pipeline joints, pipeline fixation, spring drive devices, temperature controllers, temperature sensor triggers and the like due to their excellent shape memory effect and superelasticity, in the fields of vibration control components, cone dampers and the like due to their high damping performance, and possibly in the fields of chemical industry, ship parts and the like due to their excellent corrosion resistance.

However, for NiTi shape memory alloys, their transformation temperature is very sensitive to their chemical composition; impurity elements (such as C and N) will be introduced into NiTi shape memory alloys during smelting, casting and rolling the alloys, which may change their phase transition temperature and affect their functional properties (Reference 1: *Acta mater.* 58 (2010) 3444-3458). In addition, NiTi shape memory alloys have low thermal conductivity and poor processability, which reduce their processing and production efficiency; therefore, it is impossible or extremely difficult to form precision and complex NiTi alloy parts, such as those with porous structures and thin-walled structures, using traditional techniques (Reference 2: *Prog. Mater. Sci.* 57 (2012) 911-946). In the process of preparing NiTi alloys by 4D printing, the temperature of the molten pool is very high due to the interaction between the laser and the powder, so the Ni atoms will volatilize; this will lead to the change in the Ni/Ti atomic ratio of the formed parts, and then the great change in the phase transition temperature of the same, making the formed parts unable to meet the specific service requirements (Reference 3: *Scr. Mater.* 146 (2018) 164-168). Therefore, exploring new NiTi alloy forming processes and effectively regulating the phase transition temperature of NiTi alloys have become an urgent problem to be solved. At present, the phase transition temperature of 4D-printed NiTi alloys is generally regulated by heat treatment; there are few reports on the in-situ regulation of the phase transition temperature and functional properties of 4D-printed NiTi alloys, and on the preparation of high-density NiTi alloys and their parts (Reference 4: *Prog. Mater. Sci.* 83 (2016) 630-663).

4D printing technology is a preparation technology for additive manufacturing (3D printing) of intelligent materials, and can realize the integrated design of structure and function. The 4D printing technology of NiTi alloys, as an important intelligent material, has attracted extensive attention from researchers. This technology can directly melt metal powder completely under the action of an external heating source according to a 3D data model and then solidify the molten metal powder into a metal part with good metallurgical bonding and high precision, especially suitable for the manufacture of complex thin-walled precision components such as those with thin walls, complicated internal cavities and internal flow paths that are difficult to achieve by traditional machining techniques. There is high-purity argon protection in the 4D-printing forming process, and the oxygen content is less than 300 ppm, which can greatly reduce the impurity content in the formed parts. At present, the preparation technology of powder for additive manufacturing mainly includes gas atomization method and water atomization method. Currently, NiTi alloy powder is mainly prepared by rotating electrode gas atomization method, which has high cost, can only produce single-component NiTi alloy powder at a time, and is difficult to regulate the composition, with NiTi alloys for commercial application having single composition.

CONTENTS OF THE INVENTION

In view of the above disadvantages and deficiencies of the prior art, the primary object of the present invention is to provide a 4D printing method capable of in-situ regulating functional properties of NiTi alloys. This method, proposing to use the 4D printing technology to realize additive manufacturing of mixed powder of NiTi alloy powder and nano-sized Ni powder, adjusts the mixing ratio of the NiTi alloy powder and the nano-sized Ni powder, then precisely regulates the Ni/Ti atomic ratio of the 4D-printed NiTi alloy, and finally regulates the phase transition temperature and functional properties, so as to expand the industrial application field of NiTi alloys.

Another object of the present invention is to provide a NiTi alloy prepared by the above method.

Still another object of the present invention is to provide the application of the above-mentioned NiTi alloy in the preparation of the following components: spinal orthopedic rods, intramedullary needles/nails, angioplasty rings or surgical micro forceps and other biomedical devices; pipeline joints, intelligent temperature control devices, spring drive device, temperature sensor triggers and other chemical and sanitary equipment; vibration control components, and cone dampers; self-deployable trusses, self-deployable communication satellite parts and other aerospace components.

The objects of the present invention are achieved through the following technical solution:

A 4D printing method capable of in-situ regulating functional properties of NiTi alloys is provided, comprising the following steps:

(1) milling: mixing a certain amount of pure Ti and pure Ni, and smelting them to obtain NiTi alloy bars; then preparing alloy powder by the rotating electrode atomization method, and sieving the powder to obtain the NiTi alloy powder with a particle size of 15-53 μm;

(2) powder modification: placing the NiTi alloy powder obtained in step (1) in a discharge plasma assisted ball mill for discharge treatment to promote the activation of powder activity, then adding nano-sized Ni powder with a particle size of 100-800 nm to obtain mixed powder, and continuing the discharge treatment to realize the metallurgical bonding between the NiTi alloy powder and the nano-sized Ni powder to obtain the modified powder; and (3) 4D-printing forming: using the additive manufacturing technology to prepare and form the modified powder treated in step (2) into a functionalized NiTi alloy.

Preferably, the atomic percentage elemental composition of the NiTi alloy powder in step (1) is Ti 50-60 at. % and Ni for the balance.

Preferably, the amount of the nano-sized Ni powder added in step (2) is such that the atomic percentage elemental composition of the mixed powder is Ti 45-50 at. % and Ni for the balance.

Preferably, the discharge treatment conditions for promoting the activation of powder activity in step (2) are as follows: the voltage is 120-130 V, the current is 1-1.4 A, the electrode speed is 800-1000 r/min, the duration of each discharge treatment is 0.5-1.5 h, the interval between two adjacent discharge treatments is 30-60 min, and the number of discharge treatments is 3-6 times; after adding the nano-sized Ni powder, reducing the electrode speed to 500-700 r/min and adjusting the current to 1.5-1.8 A to continue the discharge treatment for 2-4 h.

Preferably, the additive manufacturing technology in step (3) refers to the selective laser melting (SLM) forming technology, and has the following specific parameters: the laser power P>60 W, the laser scanning speed v>100 mm/s, the laser scanning distance h=80-120 μm, and the powder layer thickness t=25-40 μm.

A NiTi alloy is prepared by the above method.

The above-mentioned NiTi alloy can be applied in the preparation of the following components: spinal orthopedic rods, intramedullary needles/nails, angioplasty rings or surgical micro forceps and other biomedical devices; pipeline joints, intelligent temperature control devices, spring drive device, temperature sensor triggers and other chemical and sanitary equipment; vibration control components, and cone dampers; self-deployable trusses, self-deployable communication satellite parts and other aerospace components.

The principle of the present invention is as follows: The present invention realizes metallurgical bonding by adding nano-sized Ni powder in the discharge treatment process, and using discharge plasma ball milling to uniformly coat the nano-sized Ni powder on the surface of the large-sized spherical NiTi alloy powder; this is conducive to maintaining a good spherical shape of the powder on the one hand, and can directly and effectively control the Ni content of the 4D-printed NiTi alloy matrix on the other hand, thereby regulating the phase transition temperature of the NiTi alloy, conducive to the preparation of a bulk alloy with uniform composition, structure and properties and the parts made therewith.

Compared with the prior art, the present invention has the following advantages and beneficial effects:

(1) With the phase transition temperature of the NiTi shape memory alloy very sensitive to its Ni content, the use of mixed powder as raw materials with a certain amount of Ni powder added in-situ can directly and effectively control the Ni content of the 4D-printed NiTi alloy matrix, and then regulate its phase transition temperature; besides, the NiTi alloy prepared based on the mixed powder is composed of a single B2 austenite phase, and has a density higher than 99%, a hardness greater than 300 HV, and a superelastic strain reaching 5.2%.

(2) Compared with pure powder mixing or powder mixing ball milling, the present invention uses discharge plasma ball milling to make nano-sized Ni powder evenly coated on the surface of large-sized spherical NiTi alloy powder to achieve metallurgical bonding, thereby facilitating the preparation of a bulk alloy with uniform composition, structure and properties and the parts made therewith.

(3) The present invention, adopting 4D-printing forming process to prepare the NiTi shape memory alloy, can form NiTi alloy parts with complex shapes according to the designed 3D model, quickly manufacture NiTi alloy parts with complex structures, and greatly expand the application of the NiTi alloy in medical, sanitary, aerospace and other fields.

BRIEF DESCRIPTION OF THE DRAWINGS

FIG. 1 shows the particle size distribution of the modified mixed powder in Example 1.

DETAILED DESCRIPTION OF THE EMBODIMENTS

The present invention will be described in further detail below with reference to examples and drawings, but the embodiments of the present invention are not limited thereto.

Example 1

1. Atomization milling: Mixing Ti and Ni according to the atomic ratio of Ti 50.6 at. % and Ni 49.4 at. %, and smelting them in vacuum to obtain NiTi alloy bars; atomizing the bars to obtain the original powder, and sieving the original powder to control the particle size of the target powder in the range of 15-53 μm.

2. Powder modification: Using a Plasma-BM-S plasma ball mill to treat the sieved NiTi alloy powder (mass $m_1$) by discharging with the following control parameters: the voltage at 130 V, the current at 1.4 A, the electrode speed at 800 r/min, the discharge plasma treatments for 6 times, each discharge treatment for 0.5 h, and an interval of 30 min between two adjacent discharge treatments; then adding Ni powder with a mass of $m_2$ and a particle size of 100 nm to the NiTi alloy powder treated by the discharge plasma, and controlling the ratio of $m_1$:$m_2$ to 30:1, so that the ratio of Ti:Ni in the mixed powder was 49.1:50.9 (at. %); then adjusting the electrode speed to 600 r/min and controlling the current at 1.8 A, and continuing treating the mixed powder by discharging for 2 h to obtain the final modified mixed powder.

The particle size distribution of the modified mixed powder obtained is shown in FIG. 1. The particle size comparison between the modified mixed powder and the unmodified original powder is shown in Table 1.

TABLE 1

| Powder state | $D_{10}$ (μm) | $D_{50}$ (μm) | $D_{90}$ (μm) |
|---|---|---|---|
| Unmodified original powder | 19.9 | 37.4 | 57.6 |
| Modified mixed powder | 21.4 | 37.9 | 58.9 |

It can be seen from the results in FIG. 1 and Table 1 that the addition of nano-sized Ni powder and plasma treatment had little effect on the powder morphology, the nano-sized Ni powder was evenly coated on the surface of the NiTi alloy powder, and the particle size distribution of the mixed powder was uniform.

3. 4D-printing forming: Using additive manufacturing forming equipment to perform 4D-printing forming on the modified mixed powder and unmodified original powder after the discharge plasma treatment; the process parameters were as follows: the laser power P was 70 W, the laser scanning speed v was 105 mm/s, the laser scanning distance h was 100 μm, and the powder layer thickness t was 30 μm.

4. Evaluation of modification effect: Polishing the surface of the sample obtained from the above step "4D-printing forming", and then measuring its density by the Archimedes drainage method, determining its hardness, phase composition and phase transition temperature by the DHV-1000Z equipment, X-ray diffractometer and differential scanning calorimetry, respectively, and testing its superelasticity by the Instron 8862 equipment. The results show that the NiTi alloy formed by 4D printing of the modified mixed powder in this example was composed of a single B2 austenite phase, and had a density of 99.5%, a hardness of (327±8) HV, a martensite transformation peak temperature of −12.7° C. and an austenite transformation peak temperature of 9.4° C.; besides, under compression conditions, the superelastic strain and strain recovery rate of the 4D-printing formed parts of the modified mixed powder reached 5.29% and more than 93.6% at room temperature (austenite state), respectively. The results also show that the NiTi alloy formed by 4D printing of the unmodified mixed powder was composed of a single B2 austenite phase, and had a density of 98.1%, a hardness of (281±9) HV, a martensite transformation peak temperature of −17.1° C. and an austenite transformation peak temperature of 8.3° C.; under compression conditions, the superelastic strain and strain recovery rate of the 4D-printing formed parts of the unmodified mixed powder reached 4.03% and more than 85.1% at room temperature (austenite state), respectively.

Example 2

1. Milling: Mixing Ti and Ni according to the atomic ratio of Ti 60 at. % and Ni 40 at. %, and smelting them in vacuum to obtain NiTi alloy bars; atomizing the bars to obtain the original powder, and sieving the original powder to control the particle size of the target powder in the range of 15-53 μm.

2. Powder modification: Using a Plasma-BM-S plasma ball mill to treat the sieved NiTi alloy powder (mass $m_1$) by discharging with the following control parameters: the voltage at 120 V, the current at 1 A, the electrode speed at 1000 r/min, the discharge treatments for 3 times, each discharge treatment for 1 h, and an interval of 45 min between two adjacent discharge treatments; then adding Ni powder with a mass of $m_2$ and a particle size of 500 nm to the original powder after the discharge treatment, and controlling the ratio of $m_1$:$m_2$ to 4.91:1, so that the ratio of Ti:Ni in the mixed powder was 49.2:50.8 (at. %); then adjusting the electrode speed to 700 r/min and controlling the current at 1.8 A, and continuing treating the mixed powder by discharging for 4 h to obtain the final modified mixed powder. The analysis results show that the morphology of the spherical powder had little change, the nano-sized Ni powder was evenly coated on the surface of the NiTi alloy powder, and the particle size distribution of the mixed powder was uniform.

3. 4D-printing forming: Using additive manufacturing forming equipment to perform 4D-printing forming on the modified mixed powder and unmodified original powder; the process parameters were as follows: the laser power P was 250 W, the laser scanning speed v was 1250 mm/s, the laser scanning distance h was 100 μm, and the powder layer thickness t was 35 μm.

4. Evaluation of modification and forming effect: Polishing the surface of the sample obtained from the above step "4D-printing forming", and then measuring its density by the Archimedes drainage method, determining its hardness, phase composition and phase transition temperature by the DHV-1000Z equipment, X-ray diffractometer and differential scanning calorimetry, respectively, and testing its superelasticity by the Instron 8862 equipment. The results show that the NiTi alloy formed by 4D printing of the modified mixed powder in this example had a density of 99.1% and a hardness of (319±9) HV; and 4D-printing formed parts of the mixed powder was composed of a single B2 austenite phase, and had a martensite transformation peak temperature of −2.4° C. and an austenite transformation peak temperature of 17.1° C.; besides, under compression conditions, the superelastic strain and strain recovery rate of the 4D-printing formed parts of the mixed powder reached 5.21% and more than 94.2% at room temperature (austenite state), respectively. The results also show that the NiTi alloy formed by 4D printing of the unmodified mixed powder was composed of a single B2 austenite phase, and had a density of 98.3%, a hardness of (279±7) HV, a martensite transformation peak temperature of −4.3° C. and an austenite transformation peak temperature of 10.3° C.; under compression conditions, the superelastic strain and strain recovery rate of the 4D-printing formed parts of the unmodified mixed powder reached 4.26% and more than 74.2% at room temperature (austenite state), respectively.

Example 3

1. Milling: Mixing Ti and Ni according to the atomic ratio of Ti 50 at. % and Ni 50 at. %, and smelting them in vacuum to obtain NiTi alloy bars; atomizing the bars to obtain the original powder, and sieving the original powder to control the particle size of the target powder in the range of 15-53 μm.

2. Powder modification: Using a Plasma-BM-S plasma ball mill to treat the sieved NiTi alloy powder (mass ml) by discharging with the following control parameters: the voltage at 125 V, the current at 1.4 A, the electrode speed at 800 r/min, the discharge treatments for 3 times, each discharge treatment for 1.5 h, and an interval of 30 min between two adjacent discharge treatments; then adding Ni powder with a mass of $m_2$ and a particle size of 300 nm to the original powder after the discharge treatment, and controlling the ratio of $m_1$:$m_2$ to 44.4:1, so that the ratio of Ti:Ni in the mixed powder was 49:51 (at. %); then adjusting the electrode speed to 500 r/min and controlling the current at 1.8 A, and continuing treating the mixed powder by discharging for 3 h to obtain the final modified mixed powder. The analysis results show that the morphology of the spherical powder had little change, the nano-sized Ni powder was evenly coated on the surface of the NiTi alloy powder, and the particle size distribution of the mixed powder was uniform.

3. 4D-printing forming: Using additive manufacturing forming equipment to perform 4D-printing forming on the modified mixed powder and unmodified original powder; the process parameters were as follows: the laser power P was 200 W, the laser scanning speed v was 1000 mm/s, the laser scanning distance h was 80 μm, and the powder layer thickness t was 40 μm.

4. Evaluation of modification and forming effect: Polishing the surface of the sample obtained from the above step "4D-printing forming", and then measuring its density by the Archimedes drainage method, determining its hardness, phase composition and phase transition temperature by the DHV-1000Z equipment, X-ray diffractometer and differential scanning calorimetry, respectively, and testing its superelasticity by the Instron 8862 equipment. The results show that the NiTi alloy formed by 4D printing of the modified mixed powder in this example had a density of 99.2% and a hardness of (304±9) HV; and 4D-printing formed parts of the mixed powder was composed of a single B2 austenite phase, and had a martensite transformation peak temperature of −12.1° C. and an austenite transformation peak temperature of 7.9° C.; besides, under compression conditions, the superelastic strain and strain recovery rate of the 4D-printing formed parts of the mixed powder reached 5.17% and more than 91.2% at room temperature (austenite state), respectively. The results also show that the NiTi alloy formed by 4D printing of the unmodified mixed powder was composed of a single B2 austenite phase, and had a density of 97.1%, a hardness of (271±6) HV, a martensite transformation peak temperature of −14.7° C. and an austenite transformation peak temperature of 6.1° C.; under compression conditions, the superelastic strain and strain recovery rate of the 4D-printing formed parts of the unmodified mixed powder reached 3.91% and more than 69.2% at room temperature (austenite state), respectively.

The above examples are preferred embodiments of the present invention, but the embodiments of the present invention are not limited thereto, and any other alterations, modifications, replacements, combinations and simplifications made without departing from the spirit and principle of the present invention should all be equivalent substitutions and included in the scope of protection of the present invention.

The invention claimed is:

1. A 4D printing method capable of in-situ regulating functional properties of nickel-titanium (NiTi) alloys, characterized in that this method comprises the following steps:

(1) milling: mixing a certain amount of pure Ti and pure Ni, and smelting them to obtain NiTi alloy bars; then preparing alloy powder by a rotating electrode atomization method, and sieving the powder to obtain the NiTi alloy powder with a particle size of 15-53 μm;

(2) powder modification: placing the NiTi alloy powder obtained in step (1) in a discharge plasma assisted ball mill for discharge treatment to promote activation of powder activity, then adding nano-sized Ni powder with a particle size of 100-800 nm to obtain mixed powder, and continuing the discharge treatment to realize metallurgical bonding between the NiTi alloy powder and the nano-sized Ni powder to obtain the modified powder; and (3) 4D-printing forming: using an additive manufacturing technology to prepare and form the modified powder treated in step (2) into a functionalized NiTi alloy.

2. The 4D printing method capable of in-situ regulating functional properties of NiTi alloys according to claim 1, characterized in that: the atomic percentage elemental composition of the NiTi alloy powder in step (1) is Ti 50-60 at. % and Ni for the balance.

3. The 4D printing method capable of in-situ regulating functional properties of NiTi alloys according to claim 1, characterized in that: the amount of the nano-sized Ni powder added in step (2) is such that the atomic percentage elemental composition of the mixed powder is Ti 45-50 at. % and Ni for the balance.

4. The 4D printing method capable of in-situ regulating functional properties of NiTi alloys according to claim 1, characterized in that: the discharge treatment conditions for promoting the activation of powder activity in step (2) are as follows: a voltage of 120-130 V, a current of 1-1.4 A, an electrode speed of 800-1000 r/min, 3-6 discharge treatments are performed each with a duration of 0.5-1.5 h, and an interval between two adjacent discharge treatments being 30-60 min; after addition of the nano-sized Ni powder, the electrode speed is reduced to 500-700 r/min and the current adjusted to 1.5-1.8 A to continue the discharge treatment for 2-4 h.

5. The 4D printing method capable of in-situ regulating functional properties of NiTi alloys according to claim 1, characterized in that: the additive manufacturing technology mentioned in step (3) refers to SLM forming technology, and has the following specific parameters: a laser power P >60 W, a laser scanning speed v >100 mm/s, a laser scanning distance h=80-120 μm, and powder layer thickness t=25-40 μm.

6. A NiTi alloy, characterized in that: it is prepared by the method according to claim 1.

* * * * *